(12) United States Patent
Godbillon et al.

(10) Patent No.: US 10,520,106 B2
(45) Date of Patent: Dec. 31, 2019

(54) NORMALLY CLOSED SOLENOID VALVE

(71) Applicant: Robert Bosch GmbH, Stuttgart (DE)

(72) Inventors: Pascal Godbillon, Heilbronn (DE);
Massimiliano Ambrosi, Benningen (DE); Michael Eisenlauer, Affalterbach (DE); Edgar Kurz, Heilbronn-Horkheim (DE); Norbert Alaze, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 68 days.

(21) Appl. No.: 15/746,521

(22) PCT Filed: May 30, 2016

(86) PCT No.: PCT/EP2016/062146
§ 371 (c)(1),
(2) Date: Jan. 22, 2018

(87) PCT Pub. No.: WO2017/012758
PCT Pub. Date: Jan. 26, 2017

(65) Prior Publication Data
US 2018/0209559 A1     Jul. 26, 2018

(30) Foreign Application Priority Data
Jul. 22, 2015   (DE) .................. 10 2015 213 844

(51) Int. Cl.
*F16K 31/06*     (2006.01)
*H01F 7/16*      (2006.01)

(52) U.S. Cl.
CPC ...... *F16K 31/0696* (2013.01); *F16K 31/0655* (2013.01); *H01F 7/16* (2013.01)

(58) Field of Classification Search
CPC .. F16K 31/0696; F16K 31/06; F16K 31/0655; H01F 7/16; H01F 2007/1661
(Continued)

(56) References Cited

U.S. PATENT DOCUMENTS

| 3,653,630 A | 4/1972 | Ritsema |
| 4,674,540 A | 6/1987 | Takei et al. |
| 6,305,355 B1 * | 10/2001 | Hoffmann ............ F02M 47/027 123/458 |

FOREIGN PATENT DOCUMENTS

| CN | 103195967 A | 7/2013 |
| DE | 35 42 131 A1 | 5/1986 |

(Continued)

OTHER PUBLICATIONS

International Search Report corresponding to PCT Application No. PCT/EP2016/062146, dated Sep. 5, 2016 (German and English language document) (6 pages).

*Primary Examiner* — Jessica Cahill
*Assistant Examiner* — Daphne M Barry
(74) *Attorney, Agent, or Firm* — Maginot, Moore & Beck LLP

(57) ABSTRACT

A normally closed solenoid valve includes a valve sleeve, a pole core fixedly positioned in the sleeve, an axially displaceable armature, a spring, a closing element, a valve seat, and an elastic component. The spring acts between the pole core and the armature in order to push the closing element into the valve seat. The closing element interacts with the armature. A prestressing force of the spring causes a deformation of the elastic component, which is positioned between the armature and the pole core, such that an impact of the armature on the pole core is damped via a regression of the deformation of the elastic component.

15 Claims, 5 Drawing Sheets

(58) Field of Classification Search
USPC .......................................................... 251/64
See application file for complete search history.

(56) References Cited

FOREIGN PATENT DOCUMENTS

| | | |
|---|---|---|
| DE | 100 27 171 A1 | 8/2001 |
| DE | 103 11 486 A1 | 4/2004 |
| DE | 10 2010 040 631 A1 | 3/2012 |
| DE | 10 2012 200 156 A1 | 7/2013 |
| JP | 2004-19927 A | 1/2004 |

* cited by examiner

NORMALLY CLOSED SOLENOID VALVE

This application is a 35 U.S.C. § 371 National Stage Application of PCT/EP2016/062146, filed on May 30, 2016, which claims the benefit of priority to Serial No. DE 10 2015 213 844.5, filed on Jul. 22, 2015 in Germany, the disclosures of which are incorporated herein by reference in their entirety.

The disclosure relates to a normally closed solenoid valve having a valve sleeve and a pole core is fixedly arranged in said valve sleeve and an armature that comprises a valve tip is arranged in an axial displaceable manner in said valve sleeve, wherein a helical spring acts between the pole core and the armature so as to push the valve tip into a valve seat.

BACKGROUND

Solenoid valves of the type mentioned in the introduction are known from the prior art. A solenoid valve of this type is by way of example the normally closed Bosch solenoid valve MV09OS with the TTNo. 1267691803 from the year 2014, which is illustrated in FIG. 1. The solenoid valve 1 comprises a solenoid actuator that comprises a solenoid coil (not illustrated), which can be energized, and also a pole core 2 and said solenoid actuator acts on an armature 3 that is arranged in an axially displaceable manner in the valve sleeve 5, 6. The valve sleeve 5, 6 can be configured as a two-part valve sleeve having an upper valve sleeve 5 and a lower valve sleeve 6. The valve sleeve 5 is positioned in the valve bush 7. A filter 8 surrounds the inlet in the valve sleeve 6. Furthermore, the armature 3 comprises a closing element 9 that is pushed against a valve seat 10 when the solenoid actuator is in the non-energized state. For this purpose, the armature 3 is held pre-stressed in the valve sleeve 5, 6. It is usual in order to produce the pre-stressing force to provide a compression spring 4, in particular a helical spring, which acts or rather is held in a pre-stressed manner between the pole core 2 and the armature 3. The compression spring 4 is supported at one end on the fixedly arranged pole core 2 and at the other end on the displaceable armature 3. For this purpose, the armature 3 comprises a recess and the compression spring essentially lies in said recess and is guided in said recess. In an alternative embodiment, the pole core 2 can also comprise a recess and the compression spring essentially lies in said recess and is guided in said recess— this embodiment is however not illustrated in FIG. 1. The portion of the compression spring 4 that protrudes beyond the recess is supported on the pole core 2 and extends from the end face of the armature 3 that is facing the pole core 2 up to the end face of the pole core 2 that is facing the armature 3 and the spacing with respect to one another forms the so-called working air gap. This working air gap determines the maximum possible displacement travel of the armature 3 and consequently the displacement travel of the solenoid valve 1. When the solenoid valve 1 is being energized, the air gap between the pole core 2 and the armature 3 is closed in that the armature 3 moves upwards until it impacts against the pole core 2. When the solenoid valve is being de-energized, the armature is moved by the compression spring 4 downwards against the valve sleeve 5,6 until the closing element 9 lies against the valve seat 10 and the valve is consequently closed. When the said solenoid valve is being energized, the magnetic force increases as the working air gap becomes smaller. This increasing magnetic force makes it more difficult to continuously adjust the solenoid valve 1. In order to improve the adjustability, it is known to provide a compression spring 4 that has progressive spring characteristic curves or also by way of example to provide an additional spring washer (not illustrated) that has a progressive spring characteristic curve.

The document DE102010040631A1 by way of example is known from the prior art. Said document describes a normally closed solenoid having a valve sleeve and a pole core is fixedly arranged in said valve sleeve and an armature that comprises a valve tip is arranged in an axially displaceable manner in said valve sleeve, wherein a helical spring acts between the pole core and the armature so as to push the valve tip into a valve seat. It is provided that a further helical spring is connected in parallel to the helical spring.

In the case of modern, so-called 1-box braking systems, the hydraulic assembly is to be screwed directly to the bulkhead of a vehicle. This means more stringent requirements with respect to the noise-vibration-harshness (NVH) behavior for all the components in the hydraulic assembly, the reason being that noises that occur by way of example as a result of switching solenoid valves of the hydraulic assembly are transmitted directly into the interior compartment as a result of this type of fastening. In the case of a normally closed outlet valve, it is possible by way of example for a clicking noise to occur during the opening procedure if when energized the armature that is mostly manufactured from steel impacts against the pole core that is likewise manufactured from steel.

SUMMARY

When using solenoid valves with a fastening of this type, it would be advantageous to reduce noises of this type and if possible to avoid said noises completely. This could render it possible to achieve an opening behavior that is acceptable as far as the NVH behavior is concerned.

A normally closed solenoid valve having a valve sleeve is therefore provided and a pole core is fixedly arranged in said valve sleeve and an armature is arranged in an axially displaceable manner in said valve sleeve, wherein a compression spring acts between the pole core and the armature so as to push a closing element that cooperates with the armature into a valve seat. In accordance with the disclosure, the valve is characterized by virtue of the fact that a pre-stressing force of the compression spring causes an elastic component that is arranged between the armature and the pole core to deform, wherein the impact of the moving armature against the pole core is damped by means of recovering this deformation.

This is understood to mean that an electric component is introduced into the system. This component is positioned between the pole core and the armature. A compression spring that is present in the system, by way of example as a helical spring, causes a specific, defined deformation of the elastic component when the solenoid valve is in the non-energized state. As things develop, in other words, when the solenoid valve is being energized and the armature deflected, the impact of the armature against the pole core is damped by means of recovering the specific defined deformation. The effects of an armature impacting against the pole core in this manner are reduced by means of the damping action. A particular effect that is to be mentioned is the transmission of structure-borne noises that are to be reduced or avoided in the system. The term 'the impact of the armature against the pole core' is understood to mean the transmission of any type of force and/or pulse between two components. It goes without saying, that this also includes the armature indirectly impacting against the pole core via a further component, such as an elastic component or by way of example a spring washer that is positioned between the two components: armature and pole core. As a consequence, an opening behavior is achieved that is acceptable as far as the NVH behavior is concerned, even when the hydraulic assembly is connected directly to the bulkhead.

In an advantageous embodiment, the valve is characterized by virtue of the fact that the elastic component is configured at least as a spring washer, in particular as a stack of spring washers.

This is understood to mean that a spring washer can be used in order to achieve the above described effects. The number of spring washers can be adjusted in a variable manner depending upon the dimensioning and material characteristic of the washers and also depending upon the particular application and the magnitude of damping to be achieved. The described effect of the deformation and recovery of the deformation is apparent even where only one spring washer is provided. However, further effects, by way of example friction effects and the leveling out of unevenness between the spring washers can be achieved by means of using multiple washers. By way of example, it is possible in an advantageous manner to use a stack of spring washers in order to increase the effects. The spring washers can furthermore be produced as stamped parts from a standard metal sheet. They can also be manufactured in bulk. As a consequence, the solution can be achieved in a cost-effective manner.

In an advantageous embodiment, the valve is characterized by virtue of the fact that the spring washer is essentially flat in the non-deformed state and the deformation produces a curvature of said spring washer.

This is understood to mean that the spring washer comprises in principle the planar surface of a disc. The basic shape of the spring washer is thus disc-shaped and essentially flat. As a consequence, it is possible in an advantageous manner to use very simple and cost-effective standard components. The required shape in order to damp the magnitude of the impact, in other words the desired curvature, is exclusively produced by means of the pre-stressing force of the compression spring in the system. It is therefore not necessary to perform a processing step to create the shape beforehand. The curvature is merely produced by means of the regular procedure of assembling the components. It is therefore neither necessary nor advantageous that the spring washer has a defined shaped spring structure, such as by way of example a plate spring.

In a preferred further development, the valve is characterized by virtue of the fact that as a result of the pre-stressing force of the compression spring an outer edge of the spring washer is curved in the opposite direction to the effective pre-stressing force of the compression spring, wherein this curvature damps the impact of the armature against the pole core.

This is understood to mean that the components are dimensioned, characterized and matched to each other in such a manner the following effects are created. The compression spring is pre-stressed and is supported on the pole core via the spring washers and a supporting site (by way of example a residual air gap washer or an arrangement of steps in the pole core). As a result of the effect of the pre-stressing force of the compression spring, the spring washers are curved at the supporting site of the compression spring in the direction of the pole core. It goes without saying that a surface area or part surface area are to be understood to be the supporting site, by way of example also a circular segment that supports the spring washer. This curvature raises the spring washer stack at the outer diameter from the residual air gap washer or arrangement of steps in the pole core when the valve is in the non-energized state. In other words, the outer edge of the spring washer or of the spring washer stack is curved starting at the supporting site in the opposite direction to the pressure of the compression spring. When the valve is in the energized state, the working air gap existing between the armature and the pole core is closed as a result of the movement of the armature. However, the armature does not impact against the pole core in a non-damped manner as is the case in the prior art but rather, as a result of the spring travel that is available owing to the curvature of the spring washers, the impact is damped until said armature has achieved its end position. It goes without saying that even an at least regional and/or an in part recovery of the curvature results in a damping effect. The combination of the spring washer with a supporting site produces a spring system that when installed between the pole core and the armature damps the pulse of an impact and thus reduces the structure-borne noise in the system.

In a further advantageous embodiment, the valve is characterized by virtue of the fact that a supporting facility is configured between the pole core and the spring washer in the outer radial region and a hollow chamber is configured in the inner radial region, in particular so as to allow for the deformation of the spring washer.

This is understood to mean that by virtue of a physical structure of the components themselves and by means of further components, it is rendered possible to achieve the desired curvature of the spring washer in the non-energized state and also to recover the deformation as the armature impacts against the pole core. The previously described supporting site by way of example is to be understood to be the supporting facility. As already explained, it is therefore possible to use by way of example residual air gap washers as the supporting facility. In an alternative embodiment, the pole core can also be provided with an arrangement of steps in said pole core that renders this function possible. In an embodiment of this type, the spring washer can be in direct contact with the end face of the pole core that is facing the armature. One advantage of using a residual air gap washer is that planar surfaces on the armature and pole core are sufficient so as to generate the resilient and damping effect. It is consequently not necessary to provide expensive contouring on the armature and pole core which in part would also involve using palettes and result in an expensive delivery procedure so as to protect the contour. In contrast, one advantage of using a contoured structure, by way of example an arrangement of steps in the pole core, is that it is not necessary to use additional components. As a consequence, component costs are reduced. Furthermore, the assembly procedure is also reduced and simplified as a result.

In an alternative embodiment, the valve is characterized by virtue of the fact that a supporting facility is configured between the armature and the spring washer in the outer radial region and a hollow chamber is configured in the inner radial region, in particular so as to allow for the deformation of the spring washer. In particular, a stepped arrangement in the armature can be provided for this purpose.

In an advantageous further development, the valve is characterized by virtue of the fact that when the valve is in the non-energized state, there is a working air gap between the spring washer and the end face of the armature that is facing the pole core and when the valve is in the energized state the end face of the armature that is facing the pole core is in direct contact with the spring washer, in particular in direct contact and lying essentially in a planar manner against said spring washer.

In an alternative further development, the valve is characterized by virtue of the fact that when the valve is in the non-energized state there is a working air gap between the spring washer and the end face of the pole core that that is facing the armature and when the valve is in the energized state the end face of the pole core that is facing the armature is in direct contact with the spring washer, in particular in direct contact and lying essentially in a planar manner against said spring washer.

In a preferred embodiment, the valve is characterized by virtue of the fact that an end face of the pole core that is facing the armature is essentially closed and/or flat and a residual air gap washer is positioned between the pole core and the spring washer, wherein the residual air gap washer forms in particular a radially outer-lying supporting facility for the spring washer on the pole core and also a radially inner-lying hollow chamber between the spring washer and the pole core. As already explained, a so-called supporting site is necessary in order to achieve the desired effect. The effect of the pre-stressing force of the compression spring causes the spring washers to become curved at the supporting site of the compression spring—in the opposite direction to the spring force. It is possible to use as the supporting site a surface structuring of an existing component (by way of example a stepped arrangement in the pole core) or external components (by way of example a residual air gap washer). An annular standard washer in a non-magnetizable material is used by way of example as the residual air gap washer. As an alternative, it is also possible to use a magnetizable material in order to increase the magnetic force. An existing mass-produced part can be used as a residual air gap washer of this type. It can also be manufactured in bulk. As a consequence, the solution can be achieved in a cost-effective manner. In an advantageous embodiment, at least one spring washer comes into contact with the pole core, or alternatively into contact with the armature, via or by means of the residual air gap washer.

In one advantageous embodiment, the valve is characterized by virtue of the fact that an end face of the pole core that is facing the armature comprises an axially configured contour over the diameter, wherein this contour in particular forms a radially outer-lying supporting facility for the spring washer on the pole core and also a radially inner-lying hollow chamber between the spring washer and the pole core.

This is understood to mean that as already explained it is not only possible to use only an external component (by way of example a residual air washer) as the supporting site but rather it is also possible to use a surface structuring of an existing component (by way of example an arrangement of steps in the pole core). An arrangement of steps in the pole core is suitable for this purpose. Said stepped arrangement can be radially one step or also multiple steps. In addition to steps, it is also conceivable to use flowing transitions or a mixture of shapes. It is possible to provide a step of this type by way of example by means of a machining manufacturing method, such as turning and milling. The stepped arrangement is the pole core is configured in particular circumferentially around the circumference of the pole core. The stepped arrangement can comprise one or multiple notches distributed over the circumference, by way of example so as to displace a volume of fluid.

In one advantageous embodiment, the valve is characterized by virtue of the fact that the compression spring, in particular a helical spring, is arranged at least in regions between the spring washer and the armature. As already described, the armature comprises for this purpose a depression for receiving and guiding the compression spring.

In an alternative embodiment, the valve is characterized by virtue of the fact that the compression spring, in particular a helical spring, is arranged at least in regions between the spring washer and the pole core.

In a further advantageous embodiment, the valve is characterized by virtue of the fact that the spring washer is held by means of the compression spring in an axial manner against the end face of the pole core.

This is understood to mean that even in the non-energized state the spring washers are also held in a defined position. The compression spring is pre-stressed for this purpose. The compression spring can be pre-stressed during the procedure of assembling the valve. Furthermore, the compression spring is as a result supported on the pole core via the spring washers. In addition to the compression spring being supported directly, it is also possible for said compression spring to be supported directly on the pole core by means of a further component, by way of example a residual air gap washer.

In an alternative embodiment, the valve is characterized by virtue of the fact that the spring washer is held by means of the compression spring in an axial manner against the end face of the armature.

In an advantageous further development, the valve is characterized by virtue of the fact that an inner diameter of the supporting facility is greater than an outer diameter of the compression spring. As a result of a structural condition of this type, it is possible in an advantageous manner to provide the spring washers with a desired curvature. In so doing, the spring washer deforms in the direction of the effective pre-stressing force of the compression spring at the site where the compression spring acts on the spring washer. The spring washer is prevented from deforming at the supporting facility, in other words at the supporting site. As a consequence, the spring washer can deform in the outer region of the spring washer, in other words radially further outwards than the supporting facility, in the opposite direction, in other words in the opposite direction to the effective pre-stressing force of the compression spring.

DETAILED DESCRIPTION

Figure 1:
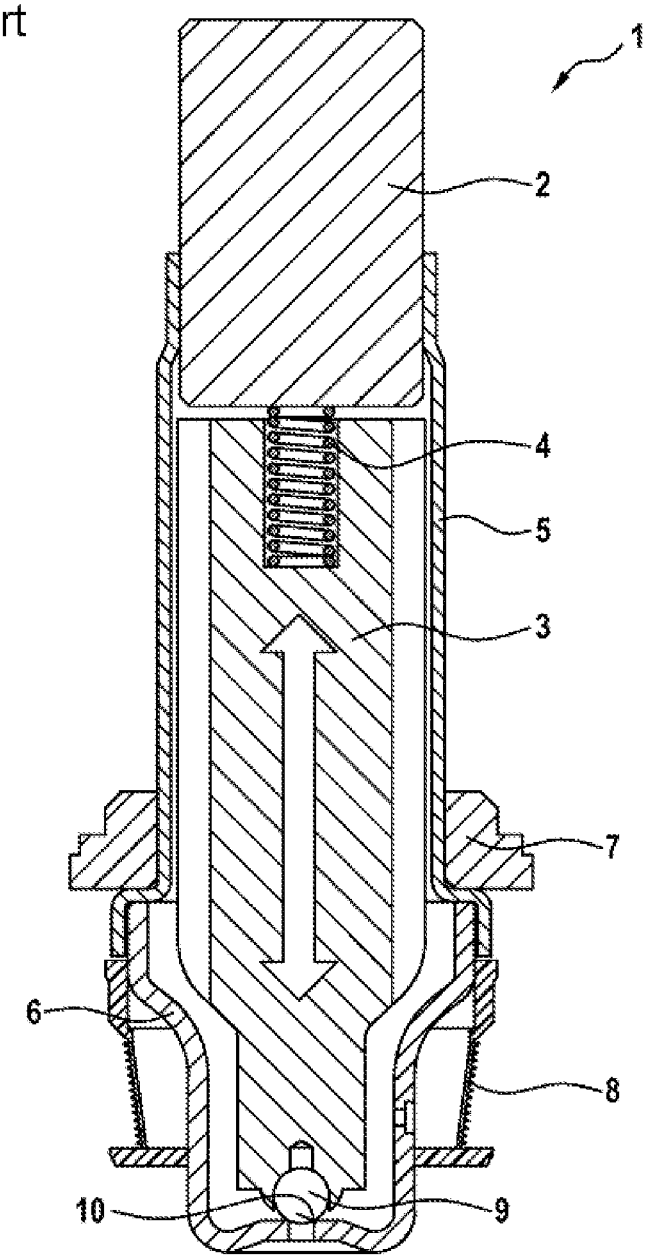
FIG. 1 illustrates a schematic sectional view of a solenoid valve from the prior art.

FIG. 1 illustrates a schematic sectional view of a solenoid valve 1 from the prior art for a hydraulic assembly for a vehicle. This solenoid valve is described in the statements relating to the prior art.

Figure 2:
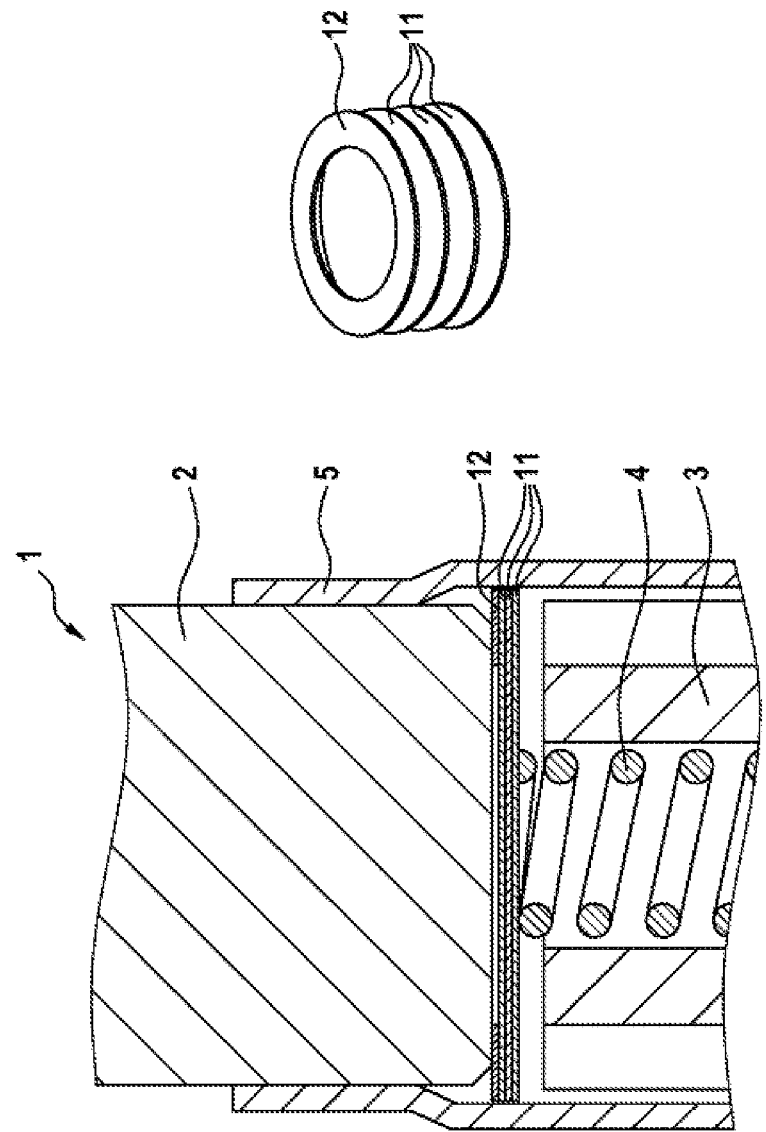
FIG. 2 illustrates a section of a sectional view of an exemplary embodiment of the solenoid valve with a residual air gap washer.

FIG. 2 illustrates a section of a sectional view of an exemplary embodiment of the solenoid valve 1 with a residual air gap washer 12 and also multiple spring washers 11. The residual air gap washer 12 is positioned directly on the pole core 2. It is possible to use a standard washer manufactured from a non-magnetizable material as the residual air gap washer 12. Multiple spring washers 11 are positioned attached to the residual air gap washer 12. These spring washers 11 are manufactured from a magnetically conductive material. A compression spring 4 that is configured as a helical spring is positioned in a recess of the armature 3 and the compression spring 4 is essentially inserted and guided in said recess. The compression spring 4 is pre-stressed and is supported on the pole core 2 via the spring washers 11 and the residual air gap washer 12. As a consequence, the spring washers 11 are held in an axial manner against the pole core 2. Furthermore, the spring washers 11 are provided with a curvature in the direction of the pole core 2 as a result of the compression spring 4 being pre-stressed. Three spring washers 11 are used in the illustrated exemplary embodiment.

Figure 3:
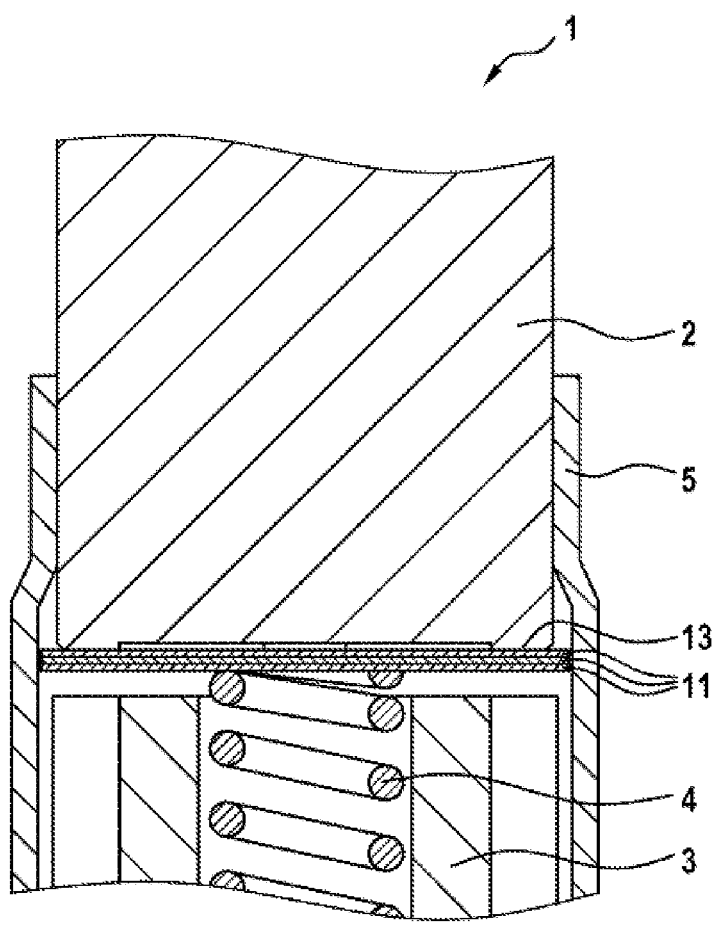
FIG. 3 illustrates a section of a sectional view of an exemplary embodiment of the solenoid valve with a stepped arrangement in the pole core.

FIG. 3 illustrates a section of a sectional view of an exemplary embodiment of the solenoid valve 1 with a stepped arrangement 13 in the pole core. Reference is made in general to the statements relating to FIG. 2. However, in contrast to the embodiment in FIG. 2, a residual air gap washer is not provided in FIG. 3. In lieu of this, the spring washers 11 are supported on the outer edge and also the required hollow chamber to allow for a curvature of the spring washers 11 is achieved in the middle as a result of a stepped arrangement 13 in the pole core 2. The stepped arrangement 13 in the pole core protrudes in a radial manner and runs over the circumference of the pole core 2. The stepped arrangement 13 can comprise one or multiple notches that are distributed over the circumference, by way of example so as to displace a volume of fluid.

Figure 4:
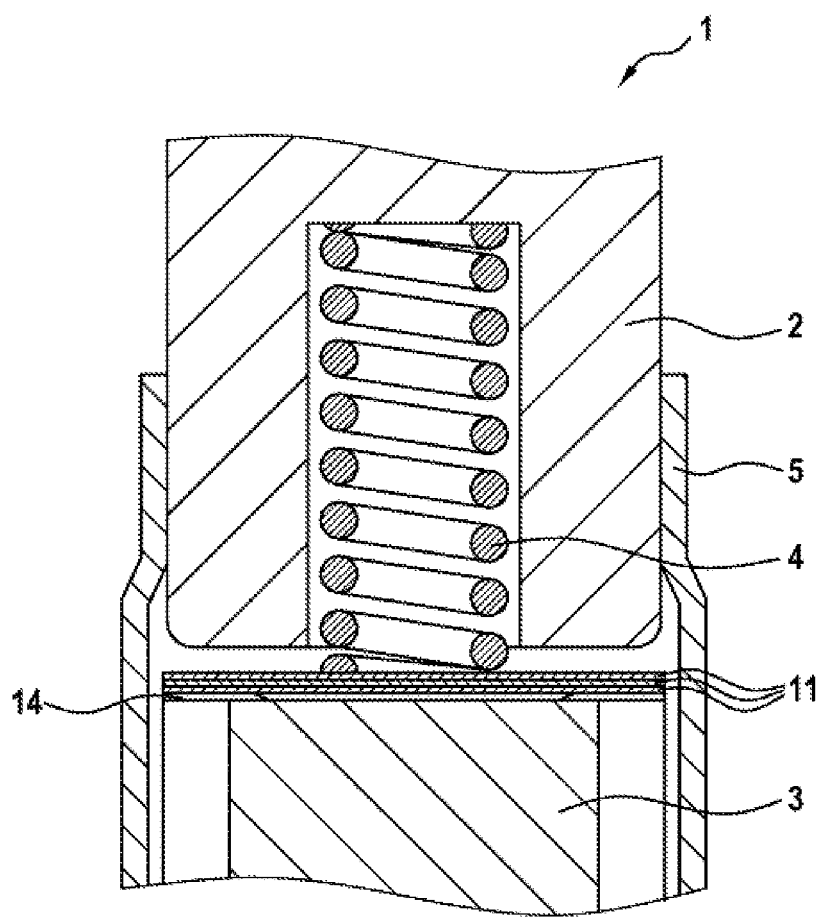
FIG. 4 illustrates a section of a sectional view of the solenoid valve with a stepped arrangement in the armature.

FIG. 4 illustrates a section of a sectional view of an alternative exemplary embodiment of the solenoid valve 1 with a stepped arrangement 14 in the armature. Reference is made once again to the statements already made in particular relating to FIG. 2 and to FIG. 3. However in the embodiment illustrated here, the compression spring 4 is integrated in an opening of the pole core 2 and also the spring washers 11 are positioned on the end face of the armature 3 that is facing the pole core 2 and said spring washers are held in this position by means of the compression spring 4. The spring washers 11 are supported on the outer edge and also the required hollow chamber to allow for a curvature of the spring washers 11 is achieved in the middle as a result of a stepped arrangement 14 in the armature 3. The stepped arrangement 14 in the armature protrudes in a radial manner and runs over the circumference of the armature 3. The stepped arrangement 14 can comprise one or multiple notches distributed over the circumference, by way of example so as to displace a volume of fluid. The curvature of the spring washers 11 occurs in the direction of the armature 3 as a result of the pre-stressing of the compression spring 4. It is also possible in an advantageous manner to generate a damping effect when the elements are positioned in this manner and the impact of the armature 3 against the pole core 2 is damped.

Figure 5:
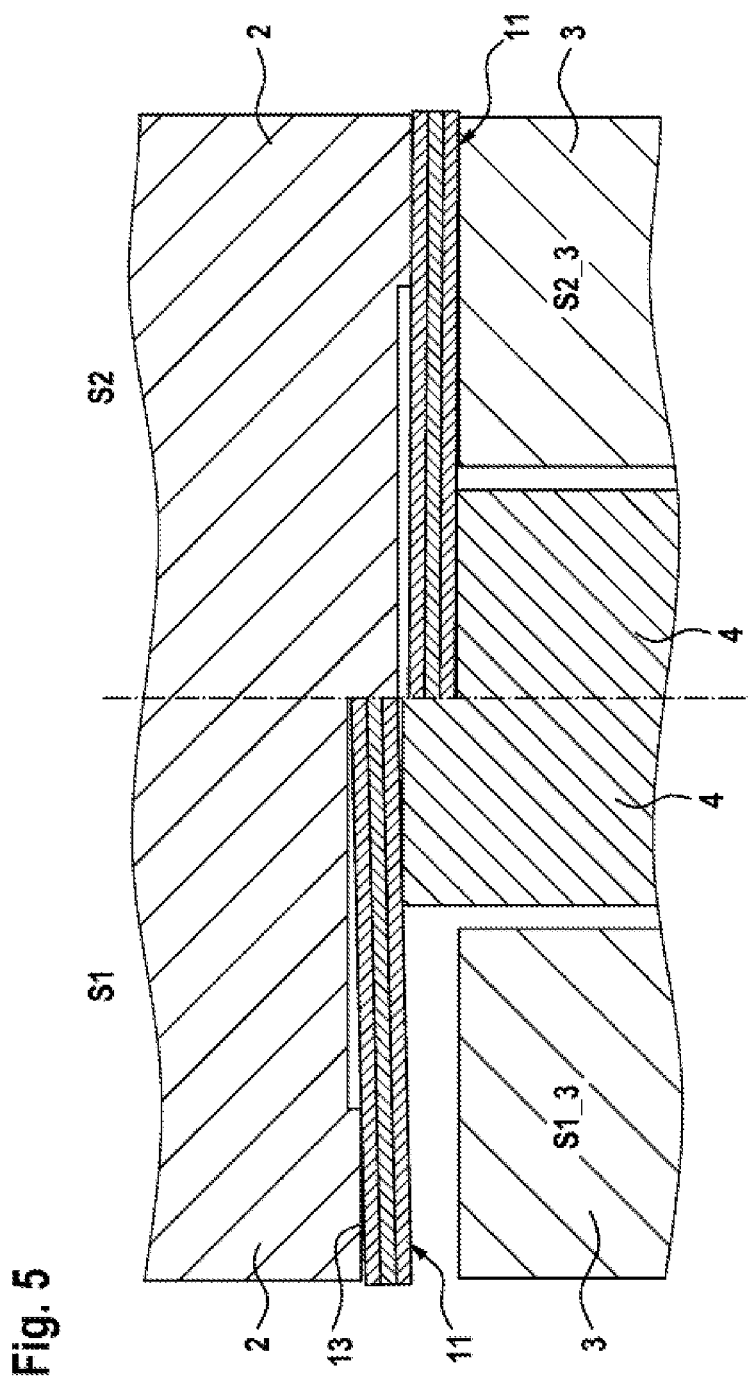
FIG. 5 illustrates a finite element view of the mode of action when the valve is in the non-energized state and also when the valve is in the energized state.

FIG. 5 illustrates a finite element view of the mode of action when the solenoid valve 1 is in the non-energized state S1 and when said solenoid valve is in the energized state S2. FIG. 5 illustrates the mode of action by way of example at the system as described in FIG. 3—with the spring washers 11 positioned on the pole core and also with a stepped arrangement 13 in the pole core. The starting position when the solenoid valve 1 is in the non-energized state is illustrated to the left-hand side of the line of symmetry. The figure illustrates the spring washer stack 11 pre-stressed by means of the compression spring 4 that is illustrated in the middle and also the curve at the outer diameter of the spring washer packet 11 in the direction of the armature 3. Furthermore, the figure illustrates the starting position S1_3 of the armature 3 for the non-energized state S1 and illustrates a working air gap between the armature 3 and the spring washer stack 11. The armature 3 is illustrated to the right-hand side of the line of symmetry in its end position when the solenoid valve is in the energized state. The end position S2-3 of the armature 3 is illustrated for the energized state S1 and the working air gap between the armature 3 and the spring washer stack 11 has been removed. The impact of the armature 3 against the pole core 2 is damped as desired by virtue of the fact that the armature 3 is delayed prior to achieving its end position by the spring washer stack 11 that is curved towards the armature 3. A portion of the movement energy of the armature 3 is converted by means of recovering the deformation of the curved spring washer stack 11.

The invention claimed is:

1. A normally closed solenoid valve comprising:
   a valve sleeve;
   a pole core fixedly positioned in the valve sleeve;
   an armature positioned in the valve sleeve so as to be axially displaceable;
   a valve seat;
   a closing element that cooperates with the armature;
   a compression spring that acts between the pole core and the armature so as to push the closing element into the valve seat, and that is prestressed so as to exert a prestressing force; and
   an elastic component that is arranged between the armature and the pole core such that the elastic component is deformed due to the prestressing force of the compression spring, and such that the elastic component recovers from the deformation in response to an impact of the armature against the pole core and damps the impact;
   wherein in a non-energized state of the valve, a gap is present between the elastic component and an end face of the armature that is facing the pole core; and in an energized state of the valve, the end face of the armature that is facing the pole core lies in direct contact with the elastic component.

2. The solenoid valve as claimed in claim 1, wherein the elastic component includes at least one spring washer.

3. The solenoid valve as claimed in claim 2, wherein the at least one spring washer is substantially flat in a non-deformed state; and the deformation results in a curvature of the spring washer.

4. The solenoid valve as claimed in claim 2, wherein the pre-stressing force of the compression spring results in a curve in an outer edge of the at least one spring washer in a direction opposite to a direction of the prestressing force of the compression spring, such that the curve is configured to damp the impact of the armature against the pole core.

5. The solenoid valve as claimed in claim 2, further comprising:
   a supporting facility positioned between the pole core and the at least one spring washer in an outer radial region; and
   a hollow chamber located in an inner radial region so as to enable the deformation of the at least one spring washer.

6. The solenoid valve as claimed in claim 5, wherein an inner diameter of the supporting facility is greater than an outer diameter of the compression spring.

7. The solenoid valve as claimed in claim 2, further comprising:
a residual air gap washer positioned between the pole core and at least one the spring washer, wherein:
an end face of the pole core that is facing the armature is at least one of substantially closed and substantially flat; and
the residual air gap washer forms a radially outer-lying supporting facility configured to support the at least one spring washer on the pole core, and forms a radially inner-lying hollow chamber between the at least one spring washer and the pole core.

8. The solenoid valve as claimed in claim 2, wherein:
an end face of the pole core that is facing the armature includes an axially configured contour around a diameter of the pole core; and
the contour forms a radially outer-lying supporting facility configured to support the at least one spring washer on the pole core, and forms a radially inner-lying hollow chamber between the at least one spring washer and the pole core.

9. The solenoid valve as claimed in claim 2, wherein the compression spring is positioned, at least in regions, between the at least one spring washer and the armature.

10. The solenoid valve as claimed in claim 9, wherein the compression spring is a helical spring.

11. The solenoid valve as claimed in claim 2, wherein the compression spring axially holds the at least one spring washer against an end face of the pole core.

12. The solenoid valve as claimed in claim 2, wherein the elastic component includes a spring washer stack.

13. The solenoid valve as claimed in claim 1, wherein in the energized state of the valve, the end face of the armature that is facing the pole core lies substantially in a planar manner against the at least one spring washer.

14. A normally closed solenoid valve comprising:
a valve sleeve;
a pole core fixedly positioned in the valve sleeve;
an armature positioned in the valve sleeve so as to be axially displaceable;
a valve seat;
a closing element that cooperates with the armature;
a compression spring that acts between the pole core and the armature so as to push the closing element into the valve seat, and that is prestressed so as to exert a prestressing force; and
at least one spring washer that is arranged between the armature and the pole core such that the at least one spring washer is deformed due to the prestressing force of the compression spring, and such that the at least one spring washer recovers from the deformation in response to an impact of the armature against the pole core and dampens the impact;
wherein the compression spring is positioned, at least in regions, between the at least one spring washer and the armature.

15. A normally closed solenoid valve comprising:
a valve sleeve;
a pole core fixedly positioned in the valve sleeve;
an armature positioned in the valve sleeve so as to be axially displaceable;
a valve seat;
a closing element that cooperates with the armature, the closing element constructed to cooperate with the valve seat;
a prestressed compression spring that acts between the pole core and the armature so as to push the closing element into the valve seat;
at least one spring washer that is arranged between the armature and the pole core such that the at least one spring washer is deformed due to the prestressing force of the compression spring, and such that the at least one spring washer recovers from the deformation in response to an impact of the armature against the pole core to dampen said impact; and
a residual air gap washer positioned between the pole core and at least one the spring washer, wherein an end face of the pole core that is facing the armature is at least one of substantially closed and substantially flat; and the residual air gap washer forms a radially outer-lying supporting facility configured to support the at least one spring washer on the pole core, and forms a radially inner-lying hollow chamber between the at least one spring washer and the pole core.

* * * * *